(12) United States Patent
Mostaert et al.

(10) Patent No.: US 11,327,627 B2
(45) Date of Patent: May 10, 2022

(54) INCIDENT CARD SYSTEM

(71) Applicant: MOTOROLA SOLUTIONS, INC., Chicago, IL (US)

(72) Inventors: Richard Mostaert, Crystal Lake, IL (US); James C. Duran, Palatine, IL (US); Anthony R. Metke, Naperville, IL (US); Trent J. Miller, West Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/244,913

(22) Filed: Apr. 29, 2021

(65) Prior Publication Data

US 2021/0286476 A1    Sep. 16, 2021

Related U.S. Application Data

(63) Continuation of application No. 16/707,129, filed on Dec. 9, 2019, now Pat. No. 11,061,526.

(51) Int. Cl.
| | |
|---|---|
| *G06F 3/0481* | (2022.01) |
| *H04L 67/306* | (2022.01) |
| *H04M 3/22* | (2006.01) |
| *G06F 16/9536* | (2019.01) |
| *H04W 4/029* | (2018.01) |

(52) U.S. Cl.
CPC ........ *G06F 3/0481* (2013.01); *G06F 16/9536* (2019.01); *H04L 67/306* (2013.01); *H04M 3/2281* (2013.01); *H04W 4/029* (2018.02)

(58) Field of Classification Search
CPC .............. G06F 3/0481; G06F 16/9536; H04M 3/2281; H04W 4/029; H04L 67/306
See application file for complete search history.

(56) References Cited

U.S. PATENT DOCUMENTS

| | | | |
|---|---|---|---|
| 7,245,273 B2 | 7/2007 | Eberl et al. | |
| 7,561,143 B1 | 7/2009 | Milekic | |
| 8,219,670 B2 | 7/2012 | Agrawala et al. | |
| 8,949,137 B2 | 2/2015 | Crapo et al. | |
| 9,178,995 B2 * | 11/2015 | Costa ................. | G06Q 50/10 |
| 9,336,675 B2 | 5/2016 | Miller et al. | |
| 9,424,306 B2 * | 8/2016 | Alon .................... | G06F 16/252 |
| 9,582,978 B2 | 2/2017 | Herbst et al. | |
| 9,646,145 B2 | 5/2017 | Vida et al. | |
| 9,959,009 B1 * | 5/2018 | Duman ............... | G06F 1/3265 |
| 11,069,015 B2 * | 7/2021 | Way ..................... | G06F 16/909 |
| 2006/0211404 A1 | 9/2006 | Cromp et al. | |

(Continued)

*Primary Examiner* — Yongjia Pan
(74) *Attorney, Agent, or Firm* — Michael Best & Friedrich LLP (57) ABSTRACT

A system for managing incidents includes an electronic display, an electronic processor coupled to the electronic display, and memory coupled to the electronic processor and storing instructions. The instructions, when executed by the electronic processor, cause the system to display an incident card on the electronic display, display first incident information on a front side of the incident card, receive a first user input indicating to flip to a back side of the incident card, determine user focus information, generate second incident information based on the user focus information, and display a back side of the card responsive to receiving the first user input. The back side includes the second incident information.

16 Claims, 8 Drawing Sheets

(56) References Cited

U.S. PATENT DOCUMENTS

| | | | |
|---|---|---|---|
| 2007/0103294 A1* | 5/2007 | Bonecutter | G08B 25/10 340/539.18 |
| 2009/0216341 A1 | 8/2009 | Enkerud et al. | |
| 2009/0284348 A1 | 11/2009 | Pfeffer | |
| 2009/0319923 A1 | 12/2009 | Schaller et al. | |
| 2010/0191554 A1 | 7/2010 | Singh et al. | |
| 2011/0016402 A1 | 1/2011 | Dailey | |
| 2011/0117878 A1 | 5/2011 | Barash et al. | |
| 2012/0203571 A1* | 8/2012 | Crapo | G06Q 10/10 705/3 |
| 2013/0283194 A1 | 10/2013 | Kopp et al. | |
| 2014/0057590 A1* | 2/2014 | Romero | H04W 4/02 455/404.2 |
| 2014/0282934 A1* | 9/2014 | Miasnik | G06F 16/95 726/5 |
| 2014/0368601 A1 | 12/2014 | deCharms | |
| 2014/0372147 A1 | 12/2014 | White | |
| 2015/0317809 A1 | 11/2015 | Chellappan et al. | |
| 2016/0036899 A1* | 2/2016 | Moody | G06F 16/951 709/217 |
| 2016/0092563 A1 | 3/2016 | Luo et al. | |
| 2017/0024088 A1* | 1/2017 | La Pean | H04W 4/90 |
| 2017/0098358 A1 | 4/2017 | Bechtel et al. | |
| 2017/0105108 A1* | 4/2017 | South | G08B 25/016 |
| 2017/0109989 A1 | 4/2017 | Herbst et al. | |
| 2017/0256151 A1 | 9/2017 | Berlic et al. | |
| 2017/0359712 A1 | 12/2017 | Meredith et al. | |
| 2018/0342028 A1 | 11/2018 | Huber et al. | |
| 2019/0357031 A1 | 11/2019 | Wickham | |
| 2019/0380020 A1* | 12/2019 | Pellegrini | H04W 4/021 |
| 2020/0059776 A1 | 2/2020 | Martin et al. | |
| 2020/0077250 A1* | 3/2020 | Gideon, III | H04W 4/029 |
| 2020/0126174 A1* | 4/2020 | Halse | G06F 40/295 |
| 2020/0264940 A1 | 8/2020 | Guereca-Pinuelas et al. | |

* cited by examiner

INCIDENT CARD SYSTEM

BACKGROUND OF THE INVENTION

A user at a public safety answering point (PSAP) may act as a call taker to handle emergency calls. The user may also act as a dispatcher by entering computer aided dispatch (CAD) incident data to create new CAD incidents for emergency calls. The PSAP and the CAD incident management are typically in separate locations from crime center operations. Further, emergency call handling and CAD incident management may not be co-located within the PSAP.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A call handler at a public safety answering point (PSAP) may handle identified incidents. One technique for providing information regarding active incidents to a call handler includes providing a virtual flip card interface on a display of a computing device operated by the call handler. Primary information regarding an incident may be provided on a front side of an incident card and secondary information (e.g., more specific or in-depth information) may be provided on a back side of the incident card.

In addition to a call handler, other individuals may use the virtual flip card system for obtaining information about an incident. For example, a supervisor in the PSAP may monitor incident handling, a detective may gather information about a crime incident, or a responder in the field may access incident information. For roles that are not co-located (i.e., call handlers, dispatchers, intelligence analysts, responders), it is difficult to provide interaction between users in the different roles of managing calls, managing incident responses, and managing crime center operations.

The use of static flip cards for incident information limits a user to certain types of information that are not always helpful for the user's particular role, and also may prevent other more useful information from being presented due to limited space. For a given incident, it can be useful to have the information provided by the incident card tailored to the particular user and the incident. As the incident status changes, the relevant information may also change. Static flip cards do not change based on the context of the user, the context of the event, or the current or past focus of the user. Accordingly, embodiments disclosed herein provide, among other things, a system and method for providing incident information on an incident card.

One embodiment provides a system for managing incidents including an electronic display, an electronic processor coupled to the electronic display, and memory coupled to the electronic processor and storing instructions. The instructions, when executed by the electronic processor, cause the system to display an incident card on the electronic display, display first incident information on a front side of the incident card, receive a first user input indicating to flip to a back side of the incident card, determine user focus information, generate second incident information based on the user focus information, and display a back side of the card responsive to receiving the first user input. The back side includes the second incident information.

Another embodiment provides a method for managing incidents. The method includes displaying an incident card on an electronic display of a user. The electronic display is coupled to and controlled by an electronic processor. First incident information is displayed on a front side of the incident card by the electronic processor on the electronic display. A first user input indicating to flip to a back side of the incident card is received by the electronic processor. User focus information is determined by the electronic processor. Second incident information is generated by the electronic processor based on the user focus information. A back side of the incident card is displayed by the electronic processor on the electronic display responsive to receiving the first user input. The back side includes the second incident information.

Figure 1:
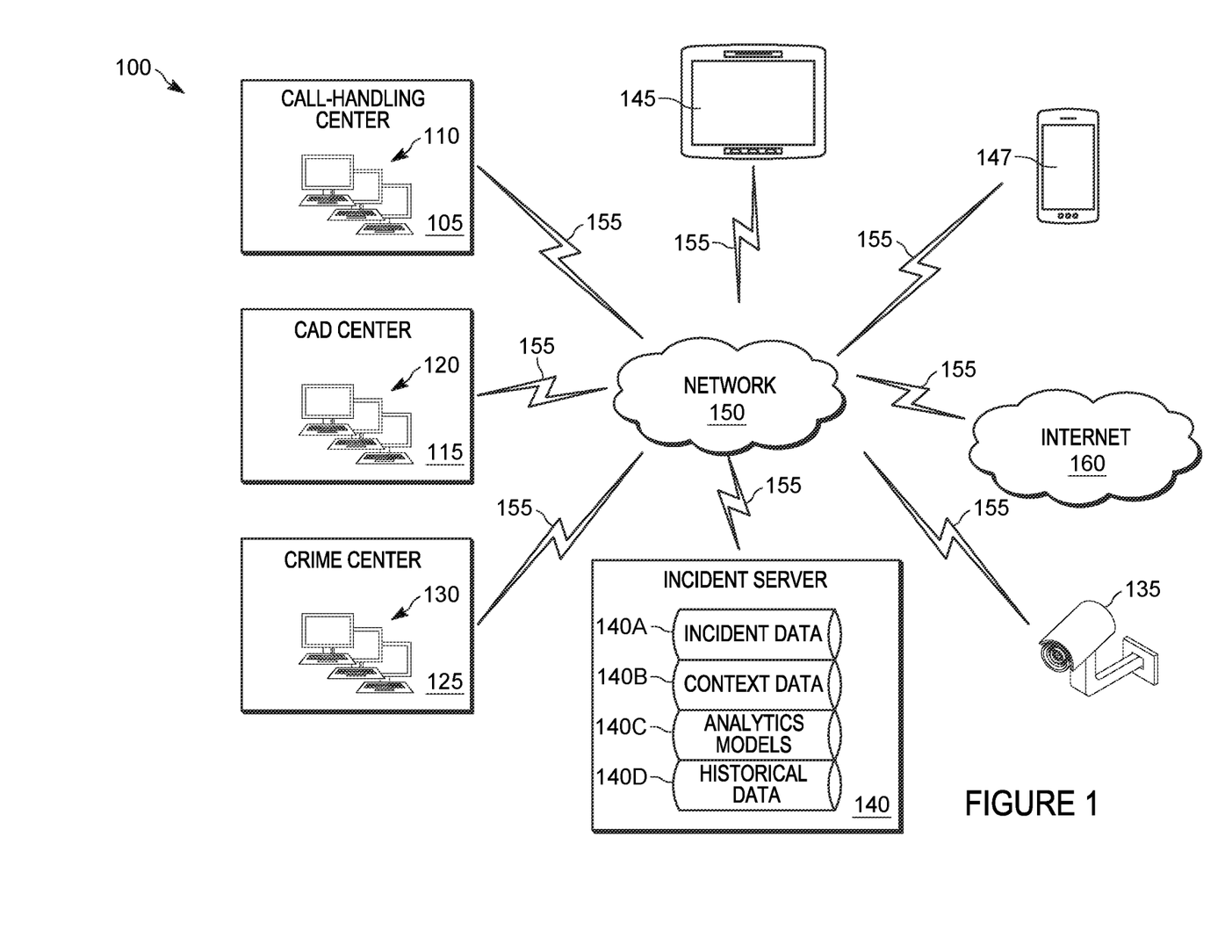
FIG. 1 is a block diagram of a communication system, according to some embodiments.

FIG. 1 is a block diagram of an example of a communication system 100. FIG. 1 shows one example of a network in which the invention may be implemented. This example is for illustrative purposes only and the invention may be implemented on other networks. In the example shown, the communication system 100 includes a call handling center 105. The call handling center 105 includes a plurality of call handling computing devices 110 each operated by a different call handler. In some embodiments, a call handler is a person who analyzes communications (for example, a voice call, a video call, text messages, and the like) received from a citizen via a call handling computing device 110 (for example, a computer having a screen, voice, video, and text capabilities). The call handler identifies an incident based on the communication, and decides how to respond to the communication to help the citizen and handle the incident. For example, the call handler may transfer the communication to a different agency (for example, animal control), take no action (for example, when the communication is a prank call or an accidental call), or transfer the communication to a dispatcher.

In some embodiments, the communication system 100 includes a computer aided dispatch (CAD) center 115. The CAD center 115 includes a plurality of CAD computing devices 120 each operated by a different dispatcher. In some situations, a CAD computing device 120 of a dispatcher receives communications from citizens in response to call handlers using call handling computing devices 110 to transfer the communications to the CAD computing device 120. In some situations, the dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the call handling center 105 and the CAD center 115 may be co-located, for example, in a security management office at a theme park or a public safety command center such as a police headquarters, fire station, dispatch center, public safety answering point (PSAP), operations center, command and control facility, and the like.

In some embodiments, the communication system 100 includes a crime center 125. The crime center 125 (an example of a "real-time crime center") includes a plurality of crime center computing devices 130 each operated by a different intelligence analyst. In some embodiments, the plurality of crime center computing devices 130 are configured to receive video feeds from a plurality of cameras 135. In some embodiments, the plurality of cameras 135 includes security cameras, traffic cameras, police observation device (POD) cameras, body-worn cameras of officers (or security personnel), dash cameras of police vehicles (or security vehicles), or a combination thereof. Alternative or in addition, the plurality of cameras 135 includes cameras that are included in network-connectable communication devices of civilians such as smart phones and tablets.

In some embodiments, the communication system 100 includes an incident server 140. In some embodiments, the incident server 140 includes an incident data store 140A storing identification data associated with incidents, a context data store 104B that receives and stores context data associated with the incidents, an analytics models store 140C that stores information for automated analysis, and a historical data store 140D storing general information, such as addresses, criminal records, identity records, and the like. In some embodiments, the analytics models store 140C includes data and programs for performing artificial intelligence (AI) analysis, such as AI model information, AI model training data, AI model template data, AI pipeline data, AI model labeled data, and the like.

The incident server 140 may include additional components than those illustrated in FIG. 1 in various configurations. The incident server 140 may also perform additional functionality other than the functionality described herein. Also, the functionality described herein as being performed by the incident server 140 may be distributed among multiple devices, such as multiple servers included in a cloud service environment. In addition, in some embodiments, one or more of the computing devices 110, 120, 130 may be configured to perform all or a portion of the functionality described herein as being performed by the incident server 140.

It should be understood that although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In some embodiments, the communication system 100 includes one or more remote terminals 145 for users in the field. Field users may include medical or police responders, supervisors, or any other individual in the field that may have a need to obtain incident information. For example, field users may be associated with one of the call handling center 105, the CAD center 115, or the crime center 125. In some embodiments, remote terminals 145 include computers, tablets, vehicular computing devices, wearable computing devices, smart phones, or the like.

In some embodiments, the call handling computing devices 110 are operated by 911 call handlers that receive communications from citizens who enter 9-1-1 on their communication devices 147. For example, a call handling computing device 110 may receive a call from the communication device 147 of a remote caller who entered 9-1-1 on the communication device 147.

As indicated in FIG. 1, the devices illustrated in FIG. 1 may communicate with each other over a network 150 over respective wireless links 155 and via corresponding network interfaces including one or more transceiver circuits (for example, by sending and receiving radio signals). Although depicted in FIG. 1 as communicating with each other over the network 150 over respective wireless links 155, one or more of the illustrated components may communicate with each other over the network 150 over one or more wired links (not shown). For example, one or more of the cameras 135 may communicate with one or more of the crime center computing devices 130 over the network 150 over one or more wired links. The network 150 (which may be an example of an "intervening internet protocol (IP) network") may include wireless and wired portions. In some embodiments, all or portions of the network 150 operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. In some embodiments, the network 150 includes an interface to the Internet 160, a Bluetooth™ network, a wireless local area network (for example, Wi-Fi), a wireless accessory Personal Area Network (PAN), a Machine-to-machine (M2M) autonomous network, a public switched telephone network, or a combination thereof.

Figure 2:
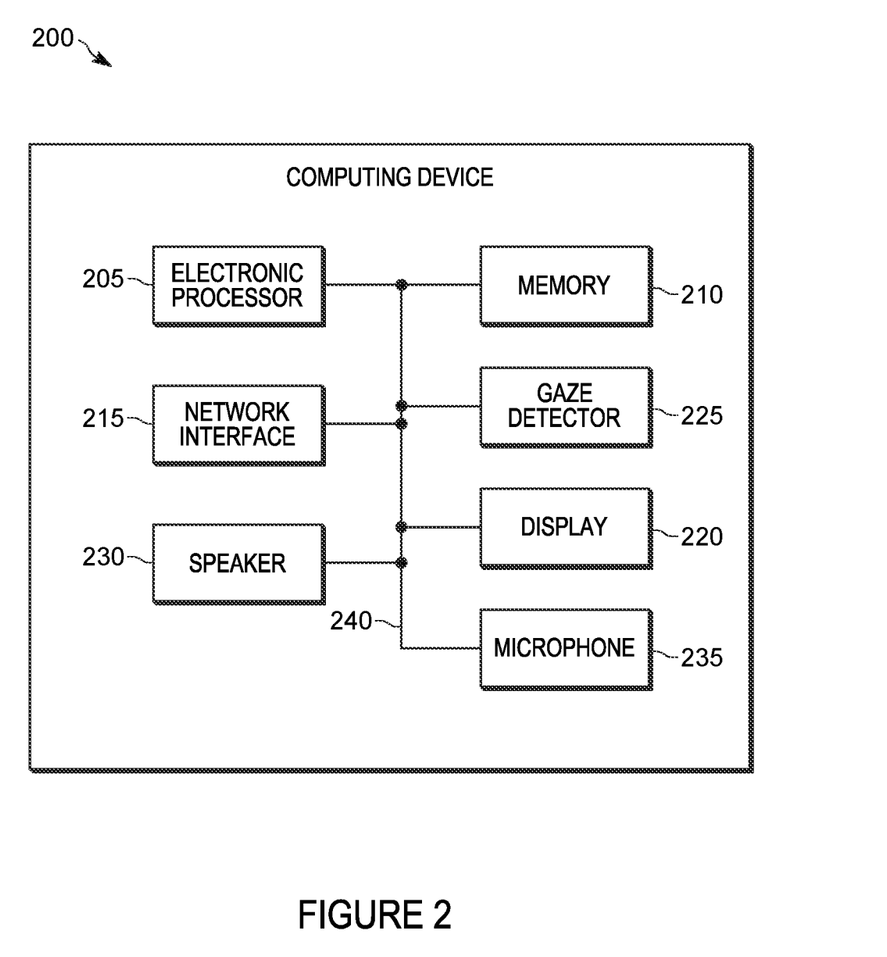
FIG. 2 is a block diagram of an example of an embodiment of a computing device included in the communication system of FIG. 1, according to some embodiments.

FIG. 2 is a block diagram of one example of an embodiment of a computing device 200 that is used to access incident information using an incident card interface. The computing device 200 may be one of the computing devices 110 in the call handling center 105, one of the computing devices 120 in the CAD center 115, one of the computing devices 130 in the crime center 125, the incident server 140, a remote terminal 145, or some other device. The computing device 200 illustrated in FIG. 2 includes an electronic processor 205 (for example, a microprocessor or other electronic device), memory 210, a network interface 215, an electronic display 220, a gaze detector 225, a speaker 230, and a microphone 235. The electronic processor 205, the memory 210, the network interface 215, and the other components of the computing device 200 are communicably coupled to each other via a bus 240. In some embodiments, the computing device 200 includes fewer or additional components in configurations different from that illustrated in FIG. 2. For example, the computing device 200 may additionally include a push-to-talk button or a camera. As another example, the computing device 200 may include one or more additional input devices such as a computer mouse and a keyboard that receive inputs from a user of the computing device 200.

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from the network 150. In some embodiments, the network interface 215 includes one or more transceivers for wirelessly communicating with the network 150. Alternatively or in addition, the network interface 215 may include a connector or port for receiving a wired connection to the network 150, such as an Ethernet cable. The electronic processor 205 may receive one or more data feeds over the network 150 through the network interface 215 (for example, data feeds generated by one or more of the cameras 135 and transmitted over the network 150). In some embodiments, communication of data feeds may occur in approximately real-time. The electronic processor 205 may communicate data generated by the computing device 110 over the network 150 through the network interface 215. For example, the electronic processor 205 receives electrical signals representing sound from the microphone 235 and may communicate information relating to the electrical signals over the network 150 through the network interface 215 to other devices. Similarly, the electronic processor 205 may output the one or more data feeds received from the network 150 through the network interface 215 through the electronic display 220, the speaker 230, or both. For example, the computing device 110 may engage in a voice call with the communication device 147 of the remote caller over the network 150.

In some embodiments, the electronic display 220 displays incident cards, images, video (e.g., video feeds from the cameras 135), text, data from sensor input, or a combination thereof. The electronic display 220 may be, for example, a liquid crystal display (LCD) screen or an organic light emitting display (OLED) display screen. In some embodiments, a touchscreen input interface may be incorporated into the electronic display 220 as well, allowing the user to interact with content provided on the electronic display 220. The gaze detector 225 interfaces with the electronic display 220 to identify a portion of the display that the user's gaze is directed to. In some embodiments, the gaze detector 225 includes a camera mounted to or integrated with the electronic display 220. The speaker 230 converts electrical signal into audible sound. In some embodiments, one or both of the electronic display 220 and the speaker 230 are referred to as an "output interface" of the call handling computing device 110 that present data feeds to a user (for example, a call handling user). The microphone 235 converts acoustic waves into electrical signals. In some embodiments, one or more of the microphone 235, a computer mouse, a keyboard, and a touchscreen input interface of the electronic display 220 are referred to as an "input interface" of the call handling computing device 110 that receive input from the user.

Figure 3:
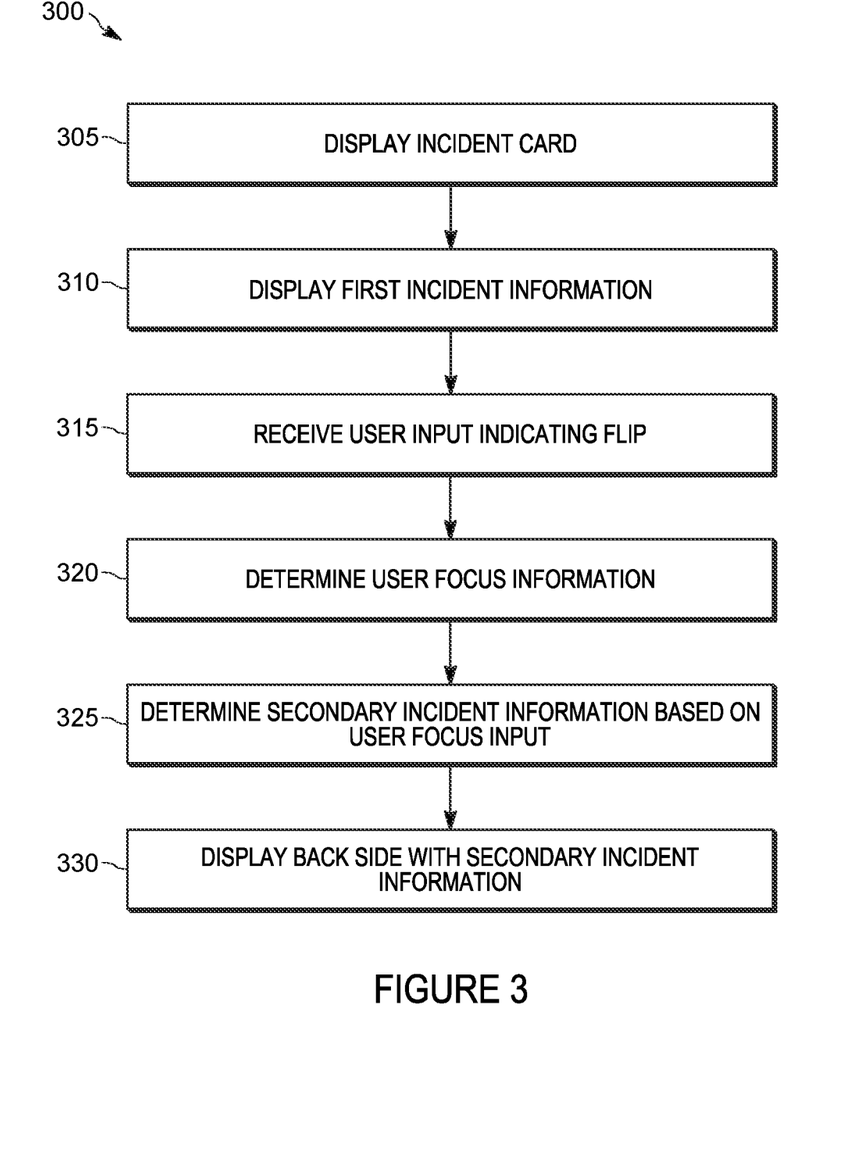
FIG. 3 is a flowchart of a method performed by a computing device for managing incident cards, according to some embodiments.
Figure 4A:
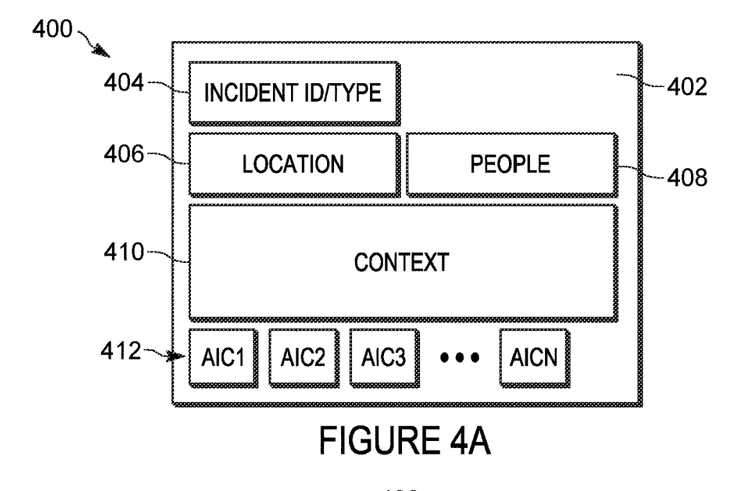
FIGS. 4A-4C are diagrams illustrating an incident card generated by the system of FIG. 1, according to some embodiments.

FIG. 3 illustrates a flowchart of a method 300 performed by a computing device 200 for managing incident cards, according to some embodiments. At block 305, the electronic processor 205 displays an incident card on the electronic display 220. FIG. 4A is a diagram illustrating an incident card 400, which is an example of an incident card that is displayed at block 305 on the display 220. In some embodiments, the incident associated with the incident card to be displayed may be identified responsive to a call placed to the call handling center 105 from the communication device 147 of a remote caller. Individuals in the call handling center 105, the CAD center 115, the crime center 125, or individuals at a remote terminal 145 may initiate an incident. In other embodiments, the incident may be initiated by sensor data (gunshot detection), or analytics (violent crowd observed).

At block 310, the electronic processor 205 displays first incident information on a front side 402 of the incident card 400. For example, with reference to FIG. 4A, the front side 402 that shows primary information regarding the incident. Example data provided on the front side 402 includes an incident ID/type field 404 indicating an incident number and an incident type, a location field 406 indicating a location of the incident (address, coordinates, room number, or other location information), a people field 408 indicating one or more individuals that have been associated with the incident, a context field 410 indicating status information associated with the incident, and one or more action identifier controls 412 providing controls that may be selected by a user to obtain secondary information about the incident. The particular fields provided on the incident card 400 and their locations on the incident card 400 may vary, depending on the implementation environment.

In some embodiments, the incident card 400 is populated by the electronic processor 205 or the incident server 140 based on a user context. In some embodiments, the data displayed on the front side 402 of the incident card 400 may differ depending on the particular user that interfaces with the incident card 400. User profile information indicating a particular user's context may be stored by the incident server 140 in the historical data store 140D. The user type provides user context data to the incident server 140 that is used to tailor the information provided on the front side 405 of the incident card 400. In some embodiments, the presentation order of the information on the front side 405 of the incident card 400 varies depending on user context. The type of action identifier controls 412 provided on the front side 402 of the incident card 400 may also depend on the user's profile and context. For example, the action identifier controls 412 provided on an incident card 400 for a call handler may include controls related to the incident status, such as location, camera feed, prior incidents, or some other control, while the action identifier controls 412 provided on an incident card 400 for a supervisor may include controls related to the handling of the incident, such as responsible handler, incident status, incident timeline, or some other control. A supervisor may be presented with different incident data, a different display order, or different action identifier controls 412 compared to a trainee.

In some embodiments, the type of action identifier controls 412 provided on the front side 402 of the incident card 400 may also depend on the incident context information. For example, when the incident context information identifies an individual associated with the incident card, and the activation identifier controls 412 may include a social media control associated with the individual, a criminal history control associated with the individual, a video feed control associated with the individual, and the like. When the incident context information identifies a medical event, the activation identifier controls 412 may include a medical history control, a prior incident control, a map control, a live video control, and the like. When the incident context information identifies a person identification event, the activation identifier controls 412 may include an address control, an alias control, an associates control, a criminal history control, a photo control, and the like. Initial data from the incoming call, such as caller ID, location, and the like may be automatically entered into the incident data store 140A when the call is received, and the incident server 140 may assign an incident ID. The call handler provides additional data for the incident using one of the computing devices 110, and the additional data is stored in the appropriate data store 140A, 140B. For example, the call handler may select or modify an incident type. For example, an incoming 911 call may have an initial type of "Emergency Call". The call handler may change the incident type to "Medical", "Crime", "Fire", and the like as additional information is gathered during the call. In some embodiments, a medical event may be further classified (e.g., "Cardiac") as data is gathered. The initial location may be provided in GPS coordinates. The incident server 140 may access the historical data store 140D to match the coordinates to an address, or the call handler may input the address.

As the incident progresses, the incident data store 140B may be updated as the status changes. For example, the call handler may communicate with the CAD center 115 to request resources (e.g., police, fire, medical) be dispatched to respond to the incident. The incident card 400 may be displayed on a computing device 120 in the CAD center 115 to allow a dispatcher to assign resources. The call handler or the dispatcher may update the context data with information regarding the dispatched resources. The updated context data may be entered or displayed in the context field 410. An emergency responder, (e.g., police, medical, fire) may view the incident card 400 in the field using a remote terminal 145. The emergency responder, may also update the context data, such as by entering a more detailed medical context.

At block 315, the electronic processor 205 receives a first user input indicating to flip to a back side of the incident card. In some embodiments, a user input indicating a flip includes a mouse click, a touchscreen input, a voice command, a keyboard command, and the like. For example, the mouse click or touchscreen input may be to select one of the activation identifier controls 412, which may indicate to flip to the back side of the incident card. In other embodiments a separate flip control is shown on the front side of the incident card, and the user input selects the flip control. In some embodiments, the voice command may be received view the microphone (e.g., a user stating "flip card") and output as a signal to the electronic processor 205, which processes the signal to recognize the command (e.g., by comparing the signal to a pre-stored signal and determining a match).

At block 320, the electronic processor 250 determines user focus information. In some embodiments, determining the user focus information includes the electronic processor 250 receiving the selection of an action identifier control 412 or the selection of a field 404, 406, 408, 410, and the like. The user focus may be identified by the electronic processor 205 responsive to a mouse click, a mouse hover exceeding time threshold, a touch input from a touchscreen, a keyboard input, a user gaze input from the gaze detector 225, a voice command, a hand or facial gesture, and the like. In some embodiments, the user flip input includes the selection of certain words on the front side 402 of the incident card 400 (e.g., using a mouse, keyboard, or touch screen), and the electronic processor 250 determines the user focus information based on the particular words selected. In some embodiments, the user input indicating the flip (at block 315) and the user focus information are determined (at block 320) using the same user operation. For example, a mouse click of an action identifier control 412 may provide a user input to flip and specify user focus information.

At block 325, the electronic processor 250 generates second incident information based on the user focus information. The user focus information designates the user's interest regarding a portion of the primary incident information on the front side 402 of the incident card 400 or the user's interest in information related to an activation identifier control 412. For example, when the user selects the location field 406 or a map action identifier control, the second incident information may include map information. As another example, when the user selects the people field 408 or an action identifier control associated with an individual, the second incident information may include history information regarding an identified individual (e.g., prior incidents, prior addresses, known associates, criminal history, and the like). In some embodiments, to generate second incident information, the electronic processor 205 communicates with the incident server 140 and receives the second incident information generated at the incident server 140.

Figure 4B:
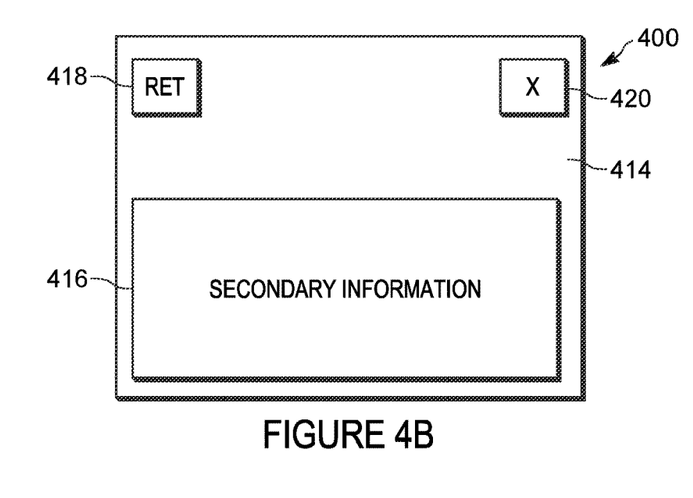

At block 330, the electronic processor 205 displays, on the electronic display 220, a back side 414 of the incident card 400 including the second incident information. In some embodiments, the back side 414 includes a secondary information field 416, where the second incident information is displayed. As the electronic processor 205 receives additional incident context information, the information in the secondary information field 416 may be dynamically updated. In some embodiments, the back side 414 also includes a return control 418 and a cancel control 420.

In some embodiments, the electronic processor 205 provides an animated sequence when displaying the back side 414 of the incident card 400. For example, the electronic processor 205 may create a mirror image of the front side 402 and then animate a card flip where the front side 402 is rotated out of view and the back side 414 is rotated into view by simultaneously rendering both the front side 402 and the back side 414 through a series of 3D rotation transformations of increasing angle of rotation about an axis of rotation. The electronic processor 205 may choose an axis of rotation and a direction of rotation (e.g., clockwise or counter clockwise) depending on the particular action identifier control 412 or other input selected.

In some embodiments, after viewing the back side 414 of the incident card, the user may provide a user flip input to the electronic processor 205 indicating a desire to return to the front side 402 of the incident card 400. The return control 418 and the cancel control 420 allow the user to provide a flip input. The return control 418 allows the user to indicate interest in the second incident information when returning to the front side 402, and the cancel control 420 indicates a return without interest. Other types of user input to the electronic processor 205 may be used as flip inputs, such as voice commands, keyboard inputs, mouse inputs, eye gaze inputs, mouse hover inputs, touchscreen inputs, hand or facial gestures, and the like.

In some embodiments, the user flip input indicates no interest in the second incident information and, in response, the front side 402 of the incident card 400 is re-displayed by the electronic processor 205 without modification. In some embodiments, the user flip input indicates interest in the second incident information and, in response, the front side 402' of the incident card 400 is modified by the electronic processor 205 or the incident server 140 to include third incident information associated with the incident. The modified front side 402' includes a further information field 422 (see FIG. 4C). In some embodiments, the further information is a subset of the second incident information or is based on the second incident information from the back side 414 of the incident card 400. For example, when a call handler user clicks on a map control or location field, the third incident information may include an estimated time of arrival (ETA) for a responder. As another example, in response to a supervisor user selecting a comment action identifier control, the third incident information includes some or all of the text of the comment. In some embodiments, the user may select a portion of the second incident information on the back side 414 prior to selecting the return control 418. The selected potion may be used to tailor the third incident information provided in the further information field 422. In some embodiments, the further information field 422 is dynamically updated as the incident progresses. As the electronic processor 205 receives additional incident context information, the information in the further information field 422 may be dynamically updated.

Figure 4C:
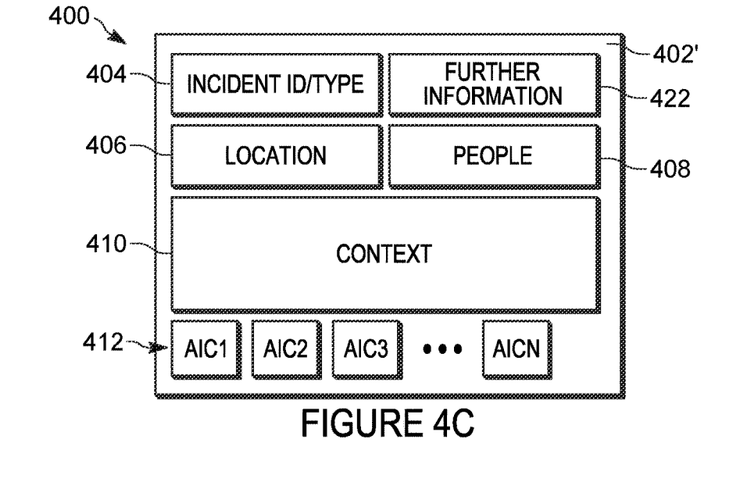

In some embodiments, the placement of the fields on the incident card 400, such as the further information field 422 may vary and may be dynamically changed depending on the user profile and the incident context. As the age of the information in the further information field 422 increases relative to the time the user performed the flip operations, the further information field 422 may be moved to a different, less prominent location (e.g. bottom of incident card 400).

Figure 5A:
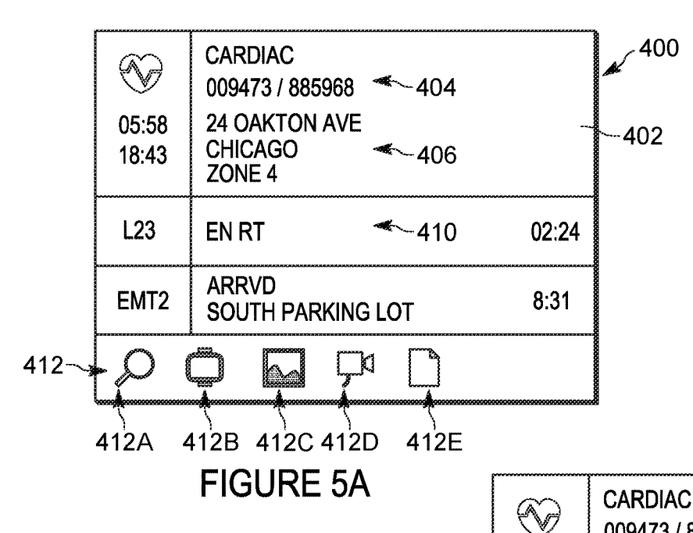
FIGS. 5A-5C, 6A-6C, 7A-7C, and 8 illustrate specific examples of incident cards for various incidents, according to some embodiments.
Figure 5B:
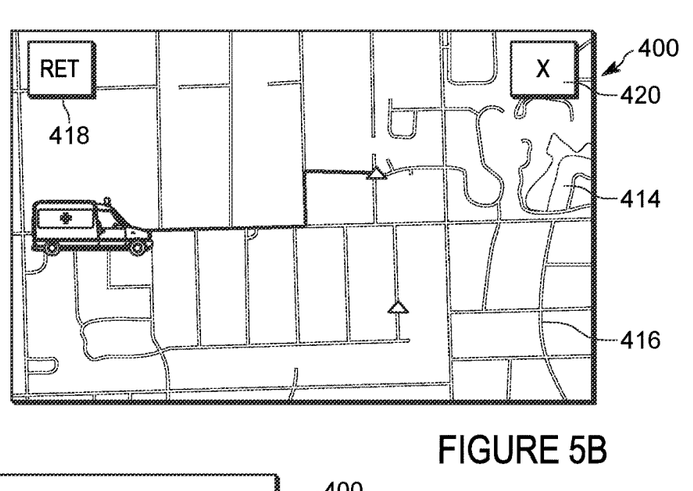
Figure 5C:
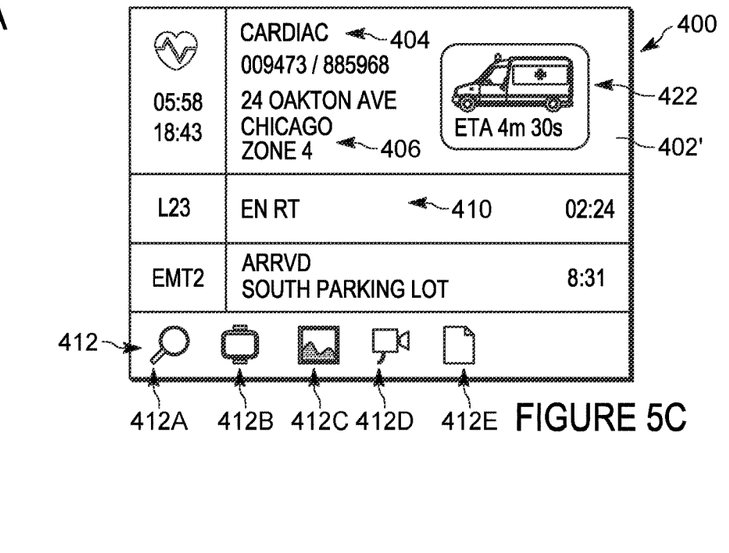

Referring to FIGS. 5A-5C, 6A-6C, 7A-7D, and 8, specific examples of incident cards 400 for various incidents are illustrated. FIGS. 5A-5C illustrate an incident card 400 for a medical incident. As seen in FIG. 5A, the incident ID/type field 404 indicates an incident number and that the incident type is "Cardiac." The call handler may enter the incident type as information is gathered regarding the incident. The location field 406 indicates a location of the incident (address, zone). The context field 410 indicates responders that have been dispatched to the incident location. As described above, a user at the call handling center 105 or a user at the CAD center 115 may enter the dispatch information. In the example of FIG. 5A, the action identifier controls 412 include a medical history control 412A, a prior incident control 412B, a live map control 412C, a video feed control 412D, and a comment control 412E.

In the example of FIG. 5A, the user selects the map control 412C, and the electronic processor 205 displays a map as the second incident information 416 on the back side 414 of the incident card 400, as shown in FIG. 5B. The user click on the action identifier control 412C provides the user input indicating a flip (at block 315) and the user focus information indicating user focus on location or map data (at block 320). Using incident context information from the incident ID/type field 404 specifying that the incident is a cardiac incident, the electronic processor 205 shows the location of an ambulance on the map. In response to the user selecting the return control 418 (indicating interest), the electronic processor 205 re-displays a modified front side 402' of the incident card 400 with the further information field 422 indicating an estimated time of arrival for the ambulance, as shown in FIG. 5C. In some embodiments, the further information field 422 is dynamically updated as the incident progresses to update the estimated time of arrival. If the user were to select the medical history control 412A in FIG. 5A, the second incident information in FIG. 5B may include known allergies, blood type, chronic conditions, and the like. In some embodiments, multiple medical history controls are displayed (e.g., one for allergies, one for chronic conditions, and the like). Controls 412 with known underlying information may be highlighted by color or flashing.

Figure 6A:
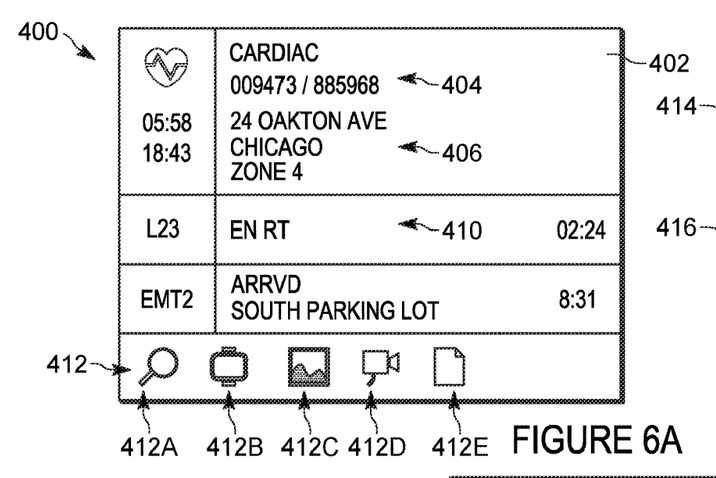
Figure 6B:
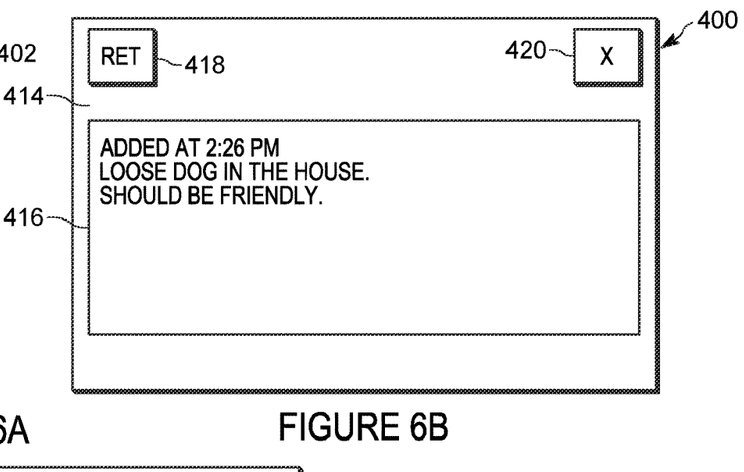
Figure 6C:
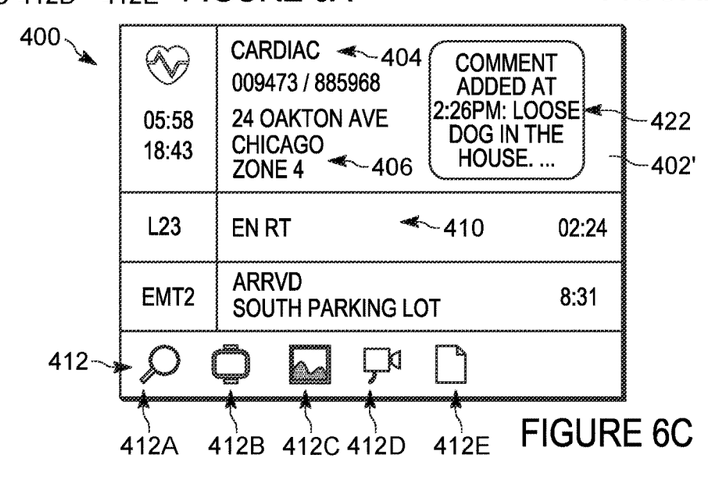

FIGS. 6A-6C illustrates an incident card 400 for same medical incident as FIGS. 5A-5C. In the example of FIG. 6A, the user selects the comment control 412E, and the electronic processor 205 displays a comment field as the second incident information on the back side 414 of the incident card 400, as shown in FIG. 6B. The user click on the action identifier control 412E provides the user input indicating a flip (at block 315) and the user focus information indicating a focus on adding a comment (at block 320). The user enters a comment indicating that a dog is present, but should be friendly. In response to the user selecting the return control 418 (indicating interest), the electronic processor 205 re-displays a modified front side 402' of the incident card 400 with the further information field 422 indicating a paraphrase of the comment, as shown in FIG. 6C. In some embodiments, the further information field 422 is dynamically updated as the incident progresses by showing more recent comments added to the incident.

Figure 7A:
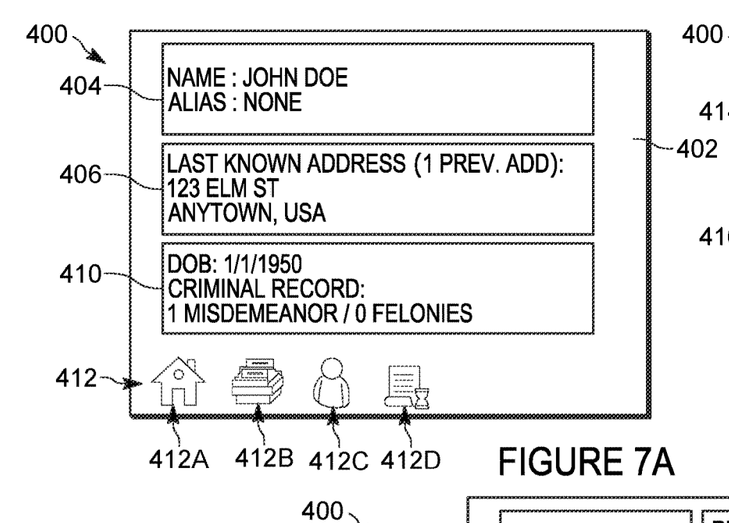
Figure 7B:
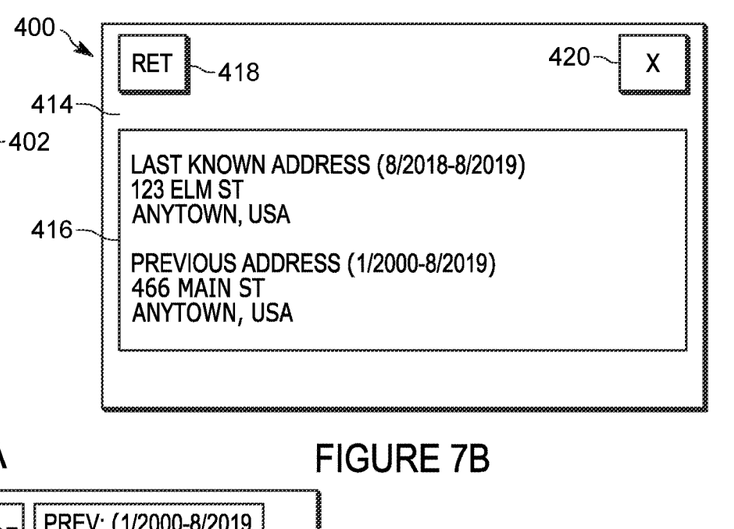
Figure 7C:
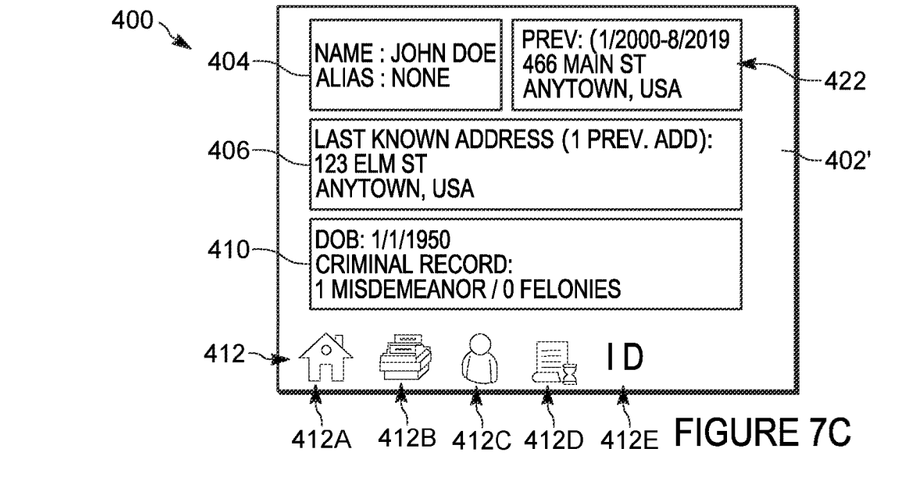

FIGS. 7A-7C illustrates an incident card 400 for a person search. An initial display may provide a list of individuals matching a particular name, and the user may select one of the individuals from the list. An incident card 400 is generated for the selected individual, as shown in FIG. 7A. The incident ID/type field 404 indicates the individual's name (and any known alias). The location field 406 indicates a last known address and the availability of any previous addresses. The context field 410 indicates identified history information, such as date of birth and criminal record. In the example of FIG. 7A, the action identifier controls 412 include a previous address control 412A, a comments control 412B, an associates control 412C (indicating known associates), and a criminal history control 412D, a photo control 412E (indicating a photo or ID picture). Data for the fields 404, 406, 410, may be provided by or retrieved from the historical data store 140D on the incident server 140. The action identifier controls 412 for a user may also be provided for other incidents associated with particular individuals.

In the example of FIG. 7A, the user selects the previous address control 412A, and the electronic processor 205 the current and previous address(es) as the second incident information on the back side 414 of the incident card 400, as shown in FIG. 7B. The user click on the action identifier control 412A provides the user input indicating a flip (at block 315) and the user focus information indicating a user focus on address information (at block 320). In some embodiments, the second incident information may also include a map. In response to the user selecting the return control 418 (indicating interest), the electronic processor 205 re-displays a modified front side 402' of the incident card 400 with the further information field 422 indicating the previous address, as shown in FIG. 7C.

Figure 8:
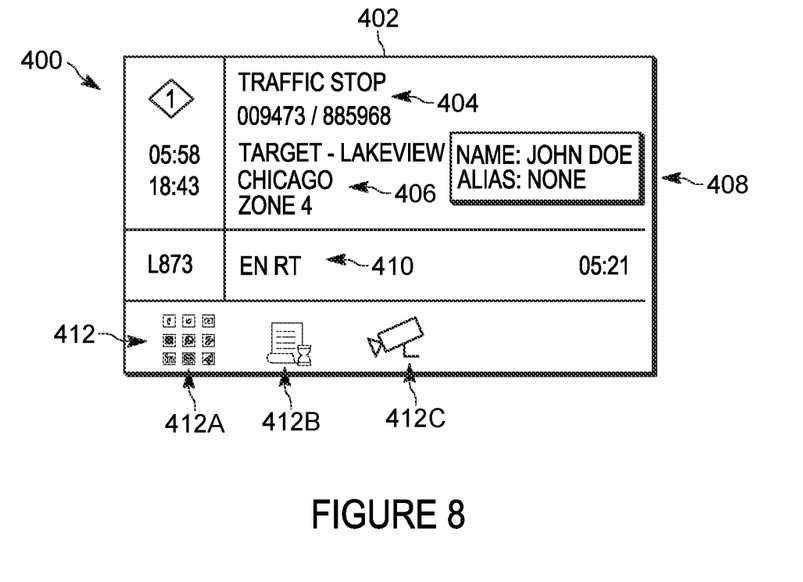

FIG. 8 illustrates an incident card 400 for a traffic stop. The incident ID/type field 404 indicates an incident number and that the incident type is a "Traffic Stop." An officer using the remote terminal 145 may enter data as information is gathered regarding the incident. The location field 406 indicates a location of the incident (street, zone). The people field 408 indicates the driver. The context field 410 indicates that an additional responder has been dispatched to the incident location. As described above, a user at the call handling center 105 or a user at the CAD center 115 may enter the dispatch information. In the example of FIG. 8, the action identifier controls 412 include a social media control 412A, a prior incident control 412B (indicating traffic or criminal history), and a video feed control 412D.

In the example of FIG. 8, the user may select the social media control 412A to request information from the incident server 140 regarding any recent social media activity by the identified person. For example, the incident server 140 may access a search program (e.g., internally or on the Internet 160 to view any relevant social media activity (e.g., the individual bragging on a social media site regarding a recent incident in the area, such as a fight or other disturbance). The user may select the prior incident control 412B to view previous traffic or criminal history associated with the individual. The user may select the video feed control 412D to retrieve a video feed from one of the cameras 135 showing recent activity by the individual (e.g., using facial recognition) of recent general activity near the current location. In some embodiments, if particular information is known, one or more of the action identifier controls 412 may be highlighted by flashing or color. The electronic processor 205 may display ay such information on a back side 414 of the incident card 400 responsive to the user selecting one of the action identifier controls 412.

Managing incident cards 400 as described herein allows primary information displayed on the front side of an incident card to be tailored to the user and also allow the user to select second incident information of interest for display on the back side of the incident card. The incident card may be updated dynamically as the incident progresses. Incident information of interest to the user may be displayed and dynamically updated on the front side of the card.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for managing incidents, comprising:
   an electronic display;
   an electronic processor coupled to the electronic display; and
   memory coupled to the electronic processor and storing instructions that, when executed by the electronic processor, cause the system to:
   display an incident card on the electronic display;
   display first incident information on a front side of the incident card;
   select first action identifier controls for display on the front side of the incident card based on user profile information of a user accessing the incident card;
   display the first action identifier controls on the front side of the incident card;
   receive a first user input indicating to flip to a back side of the incident card;
   determine user focus information;
   generate second incident information based on the user focus information and the user profile information;
   select second action identifier controls for display on the back side of the incident card based on the user profile information; and
   display a back side of the card responsive to receiving the first user input, the back side including the second incident information and the second action identifier controls.

2. The system of claim 1, wherein the instructions, when executed by the electronic processor, cause the system to:
   determine the user focus information by identifying a portion of the first incident information selected by a user.

3. The system of claim 1, wherein the instructions, when executed by the electronic processor, cause the system to:
   determine the user focus information by receiving the first user input selecting one of the first activation identifier controls.

4. The system of claim 3, wherein the instructions, when executed by the electronic processor, cause the system to:
   receive incident context information, and
   select the activation identifier controls for display on the front side of the incident card based further on the incident context information.

5. The system of claim 4, wherein the incident context information identifies an individual associated with the incident card, and the activation identifier controls comprise at least one selected from the group of a social media control associated with the individual, a criminal history control associated with the individual, a video feed control associated with the individual, an address control, an alias control, an associates control, and a photo control.

6. The system of claim 4, wherein the incident card is associated with a medical event and the activation identifier controls comprise at least one selected from the group of a medical history control, a prior incident control, a map control, and a live video control.

7. The system of claim 1, wherein the instructions, when executed by the electronic processor, cause the system to:
   generate the first incident information based on the user profile information.

8. The system of claim 1, wherein the instructions, when executed by the electronic processor, cause the system to:
   receive incident context information;
   generate the second incident information based on the incident context information;
   receive updated incident context information; and
   modify the second incident information based on the updated incident context information.

9. A method for managing incidents, comprising:
   displaying an incident card on an electronic display of a user, the electronic display coupled to and controlled by an electronic processor;
   displaying, by the electronic processor on the electronic display, first incident information on a front side of the incident card;
   selecting, by the electronic processor, first action identifier controls for display on the front side of the incident card based on user profile information of a user accessing the incident card;
   displaying, by the electronic processor on the electronic display, the first action identifier controls on the front side of the incident card;
   receiving, by the electronic processor, a first user input indicating to flip to a back side of the incident card;
   determining, by the electronic processor, user focus information;
   generating, by the electronic processor, second incident information based on the user focus information and the user profile information;
   selecting, by the electronic processor, second incident information based on the user focus information and the user profile information; and
   displaying, by the electronic processor on the electronic display, a back side of the incident card responsive to receiving the first user input, the back side including the second incident information and the second action identifier controls.

10. The method of claim 9, wherein determining the user focus information comprises identifying a portion of the first incident information selected by a user.

11. The method of claim 9, wherein determining the user focus information comprises receiving the first user input selecting one of the first activation identifier controls.

12. The method of claim 11, comprising:
    receiving, by the electronic processor, incident context information; and
    selecting, by the electronic processor, the activation identifier controls for display on the front side of the incident card based further on the incident context information.

13. The method of claim 12, wherein the incident context information identifies an individual associated with the incident card, and the activation identifier controls comprise at least one selected from the group of a social media control associated with the individual, a criminal history control associated with the individual, a video feed control associated with the individual, an address control, an alias control, an associates control, and a photo control.

14. The method of claim 13, wherein the incident card is associated with a medical event and the activation identifier controls comprise at least one selected from the group of a medical history control, a prior incident control, a map control, and a live video control.

15. The method of claim 9, wherein generating, by the electronic processor, the first incident information comprises generating the first incident information based on the user profile information.

16. The method of claim 9, comprising:
receiving, by the electronic processor, incident context information;
generating, by the electronic processor, the second incident information based on the incident context information;
receiving, by the electronic processor, updated incident context information; and
modifying, by the electronic processor, the second incident information based on the updated incident context information.

* * * * *